United States Patent
Wolf et al.

[15] 3,691,168

[45] Sept. 12, 1972

[54] 5-ARYLBENZO [B] [1,7] NAPHTHYRIDINE DERIVATIVES

[72] Inventors: Milton Wolf, West Chester; James L. Diebold, Havertown, both of Pa.

[73] Assignee: American Home Products Corporation, New York, N.Y.

[22] Filed: April 1, 1970

[21] Appl. No.: 24,836

[52] U.S. Cl. ........260/283 S, 260/286 R, 260/287 R, 260/288 R, 260/293, 260/89, 260/332.3 C, 424/258
[51] Int. Cl. ..............................................C07d 39/10
[58] Field of Search.260/287 R, 296 N, 288 R, 283 S

[56] References Cited

UNITED STATES PATENTS

| | | | |
|---|---|---|---|
| 3,555,034 | 1/1971 | Diebold | 260/296 N |
| 3,557,119 | 1/1971 | Humber | 260/287 R |
| 3,580,915 | 5/1971 | Wolf | 260/288 R |
| 3,580,915 | 5/1971 | Wolf et al. | 260/288 |

OTHER PUBLICATIONS

Kempter et al. Ber. Vol. 98 p. 419– 427 ( 1965) abstracted in Chem. Abstr. Vol. 63 Vol. 1778– 1779 ( 1965)

Wolf et al., Fr. 1,514,010, 2/68 abstracted Chem. Abstr. Vol. 70 Vol. 967804 ( 1969).

Chien et al., abstracted in Chem. Abstr Vol. 69, Col. 19051p ( 1968).

*Primary Examiner*—Donald G. Daus
*Attorney*—Andrew Kafko, Dwight J. Potter and Joseph Martin Weigman

[57] ABSTRACT

This invention concerns 5-arylbenzo[b] [1,7]naphthyridine derivatives which have pharmacological activity as antitubercular agents. Certain compounds also possess amebacidal or central nervous system depressant activity.

5 Claims, No Drawings

5-ARYLBENZO [B] [1,7] NAPHTHYRIDINE DERIVATIVES

This invention relates to new and useful tricyclic nitrogen containing compounds as well as to the novel method of their preparation. In particular, the present invention is concerned with 5-arylbenzo[b][1,7] naphthyridine compounds which in standard and accepted pharmacological tests have demonstrated activity as antitubercular agents which are useful in in vitro applications.

The novel compounds which are included within the scope of this invention are selected from the group represented by the formulas

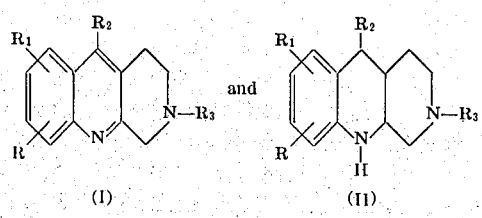

wherein R and $R_1$ are selected independently from the group consisting of hydrogen, halogen, nitro, lower alkyl, lower alkoxy and trifluoromethyl; $R_2$ is selected from the group consisting of phenyl, halophenyl, lower alkylphenyl, lower alkoxyphenyl, trifluoromethylphenyl, pyridyl, thienyl and furyl; and $R_3$ is selected from the group consisting of hydrogen, amidino, lower alkyl, phenyl, halophenyl, lower alkylphenyl, phenyl(lower)alkyl, benzoyl, lower alkanoyl, halo(lower)alkanoxl, dihalo(lower)alkanoyl, lower alkanoyloxy, di(lower)alkylamino(lower)alkanoyl, lower alkylsulfonyl, phenylsulfonyl, lower alkylcarbamoyl, lower alkoxy(lower)alkyl, di(lower)alkylamino(lower)alkyl and dihydroxy(lower)alkyl; and the pharmaceutically acceptable acid addition salts thereof.

Particular examples of such compounds include:
2-benzyl-7-chloro-1,2,3,4-tetrahydro-5-phenyl-benzo-[b][1,7]naphthyridine hydrochloride;

9-chloro-2-ethyl-1,2,3,4-tetrahydro-5-phenylbenzo-[b][1,7]naphthyridine;

8-chloro-2-ethyl-1,2,3,4-tetrahydro-5-(2-thienyl)benzo-[b][1,7]naphthyridine; and 2-ethyl-1,2,3,4-tetrahydro-7,8-dimethoxy-5-(p-methoxyphenyl)benzo[b[1,7naphthyridine.

In specification and in the appended claims, the terms "lower alkyl," "lower alkoxy," "lower alkanoyl" and the like contemplate saturated hydrocarbon radicals, straight and branched chain, having from one to about six carbon atoms and includes, for example, methyl, ethyl, n-propyl, i-propyl, n-butyl, t-butyl, n-pentyl, n-hexyl, 3-methylpentyl and the like. The term "halo" contemplates the halogen moieties, i.e., chlorine, fluorine, bromine and iodine.

In accord with the process of the present invention, the above-described 5-arylbenzo[b][1,7] naphthyridines (formula I) may be prepared by the reaction of a 2-aminocarbonyl compound (III) with an appropriate 3-piperidone (IV), as exemplified by the following reaction scheme:

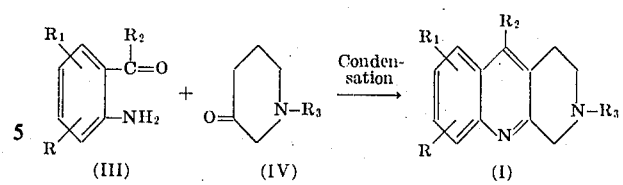

wherein R, $R_1$, $R_2$ and $R_3$ are as defined above. The reaction is effected by heating a substantially equimolar mixture of the reactants, (I) and (II), in the presence of a strong acid, at about the reflux temperature of the mixture for a period of time from about 2 to about 12 hours. Preferably this reaction is conducted in trifluoroacetic or p-toluenesulfonic acid with refluxing for about 8 hours. By strong acid, as employed herein, is meant any organic or inorganic acid which has a dissociation constant greater than $10^{-5}$ and which dissolves the reactants and does not interfere with their interaction. Although many such acids may be employed, as will suggest themselves to those skilled in the art, excellent results are obtained with trifluoroacetic and p-toluenesulfonic acids. However, generally acids such as polyphosphoric, acetic and the alkanesulfonic and arylsulfonic acids, such as benzenesulfonic, methylsulfonic and ethylsulfonic are also included. The majority of the reactants employed in the process of this invention are readily available from commercial sources, while the remainder can be prepared in accordance with standard organic procedures well known to those skilled in the art.

After the reaction is complete, the reaction mixture is cooled and basified with an aqueous alkaline solution, for example, sodium hydroxide, potassium hydroxide, sodium carbonate and sodium bicarbonate. Thereafter, the product (I) is obtained by conventional methods, such as filtration and crystallization from a suitable solvent, such as an alkanol (i.e., ethanol or isopropanol), hexane, pentane or methylcyclohexane.

The 1,2,3,4,4a,5,10,10a-octahydrobenzo[b][1,7]-naphthyridines (formula II) of the present invention are prepared by hydrogenation of their corresponding above prepared tetrahydrobenzo[b][1,7]naphthyridines (I) as exemplified by the following reaction:

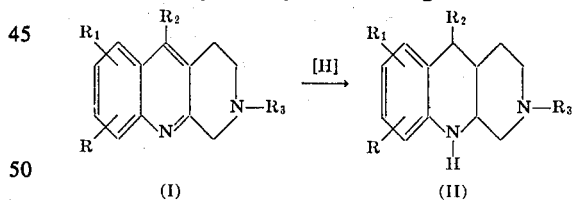

wherein R, $R_1$, $R_2$ and $R_3$ are as defined above. Although various reduction procedures may be employed, a preferred method to effect this conversion is the use of a reducing agent such as hydrogen gas. Utilizing this preferred method, a tetrahydrobenzo[b][1,7]naphthyridine is admixed with glacial acetic acid and platinum oxide at about 30°C., under a hydrogen pressure of about 50 psi, for a period of 24 hours. Thereafter, the product is separated by evaporation of the excess acetic acid and the residue is dissolved in water, basified and recrystallized to yield the appropriate octahydrobenzo[b][1,7]naphthyridine. However, mention is also made of other catalysts to be used in this hydrogenation. These would include the noble metal catalysts, i.e., platinum and palladium on a supporting structure, i.e., carbon, charcoal or alumina.

As is evident from the above-described methods of producing the tetrahydrobenzonaphthyridine and octahydrobenzonaphthyridine compounds, of this invention, these compounds can be recovered either in the form of their acid addition salts or as the free bases. These tetrahydrobenzo[b][1,7]naphthyridine and octahydrobenzo[b]d[1,7]naphthyridine bases can be converted to their acid addition salts by reacting them with the usual acids, e.g., hydrochloric, hydrobromic, hydroiodic, sulfuric and phosphoric or with an organic acid, for example, citric, acetic, benzoic, methanesulfonic or p-toluenesulfonic. While the free bases have the same pharmacological properties as their acid addition salts, they are more often utilized in the preparation of such salts rather than directly for their pharmacological effects.

In accord with the present invention, the new and novel tetrahydrobenzo[b][1,7]naphthyridine and octahydrobenzo[b][1,7]naphthyridine compounds of this invention have been found to possess interesting pharmacological properties. More particularly, these compounds, in standard pharmacological tests exhibit utility as antitubercular agents in vitro and are therefore useful wherein such agents would be indicated.

The in vitro antitubercular activity of the compounds of this invention against tubercle bacilli is tested by the following procedure:

A stock solution containing 1000 μg/ml of a test compound in a suitable vehicle, e.g., water, is prepared. One ml. quantities of various dilutions of this stock solution are added to individual tubes containing 9 ml. of medium to give final concentrations within the range of 0.01 to 100 μg/ml. These tubes are then seeded with 0.1 ml. of standardized bacterial suspension and incubated for 2 weeks at 37°C. The media employed in Dubos Oleic acid liquid medium and the stock cultures are maintained on Dorset Egg Agar. The organisms used are *M. tuberculosis*, human type, strain H 37 Rv and *M. tuberculosis*, bovine type, strain Ravenel. The results are expressed as minimal inhibitory concentration (MIC) in μg/ml which is the least concentration of a compound that will completely prevent the growth of the organism. In the above test, the compounds of this invention completely inhibit the growth of tubercle bacilli at a MIC in the range of about 1.0 to about 5.0 μg/ml.

As the compounds of this invention are biocidally active as antibacterial agents, i.e., they exhibit in vitro antitubercular activity as bacteriocidal agents against tubercle bacteria. This antitubercular property makes the compounds of this invention valuable in biocidal compositions in a variety of important fields for use. For example, they can be formulated and used in bacteriocidally (antitubercular) active institutional cleaning compositions, and in soaps and detergents. These compositions are employed for washing equipment in hospitals and homes, instruments used in medicine and bacteriology, clothing used in bacteriological laboratories, and floors, walls and ceilings in rooms in which a background free of tubercle bacteria is desired. When the above-described antitubercular agents are used for their biocidal purposes, they are applied according to their desired end-uses as powders, solutions, suspensions and the like, containing the active substance generally in concentrations of 0.1 percent to 0.7 percent by weight, or even as much as 1 percent, 1.5 percent, 1.8 percent, 2 percent and up to about 5 percent. In washing solutions, e.g., for hospitals and homes, the active antitubercular compounds of this invention will be used generally in the range of from about 0.02 percent to 0.25 percent by weight.

Although, in common with most organic substances, with relatively high molecular weights, the antitubercular compounds of this invention have limited solubility in water, those skilled in the art will have no great difficulty in formulating them into a wide variety of biocidally-active compositions. In general, standard techniques can be employed and, where necessary, advantage is taken of the ability of these compounds to form salts with acids, which have enhanced solubility in water. The active compounds per se can be made up in dilute aqueous solution. They can also be formulated as suspensions or solutions in an aqueous vehicle containing an organic co-solvent, such as, for example, an alkanol. Also, aqueous vehicles containing emulsifying agents, such as sodium lauryl sulfate, and relatively high concentrations, e.g., up to about 5 percent by weight, of the compounds of this invention can be formulated by conventional techniques.

Certain compounds of the present invention exhibit, in standard pharmacological tests, utility as central nervous system depressants, which are useful in producing a calming effect, particularly in laboratory animals.

In the pharmacological evaluation of the central nervous system depressant activity of compounds of this invention the in vivo effects are tested as follows:

The compound is administered orally as a 1 percent suspension emulsified with polyethylene oxide sorbitan monooleate to three mice (14 to 24 grams) at each of the following doses: 400, 127, 40, 12.7 and 4.0 mg./kg. The animals are watched for a minimum of 2 hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated for their Sedative-Ataxic Score by use of a pole climb and inclined screen for the presence of sedation-ataxia [Kouzmanoff et al., J. Pharm. Exp. Ther. 144, 40A (1958)]. The "Eddy Hot-Plate Method" [Nathan B. Eddy and Dorothy Leimbach, Jr. Pharmacol. Exper. Therap., 107, 385 (1953)] is used to test for analgesia. The experiment is terminated by subjecting each animal to a maximal electroshock to test for anticonvulsant activity.

The compounds and non-toxic, pharmaceutically-acceptable salts thereof of the present invention which produce a decrease in motor activity when tested by the above-described procedure include:

2-benzyl-7-chloro-1,2,3,4-tetrahydro-5-phenyl-benzo-[b][1,7]naphthyridine hydrochloride;

9-chloro-2-ethyl-1,2,3,4-tetrahydro-5-phenylbenzo-[b][1,7]naphthyridine; and 8-chloro-2-ethyl-1,2,3,4-tetrahydro-5-(2-thienyl)benzo-[b][1,7]naphthyridine.

The central nervous system depressant activity of the above compounds is demonstrated in range of from about 127.0 mg./kg. to about 400.0 mg./kg. of body weight of the animal tested.

When the tetrahydrobenzonaphthyridine and octahydrobenzonaphthyridine compounds of this invention are employed as central nervous system depressants to produce a calming effect in warm-blooded animals, e.g., mice, rats, rabbits, dogs, cats, monkeys, etc. they may be administered alone or in combination with pharmacologically acceptable carriers, the proportion of which is determined by the solubility and chemical nature of the compounds, chosen route of administration and standard biological practice. For example, they may be administered orally in the form containing such excipients as starch, milk sugar and so forth. They may also be administered orally in the form of solutions or they may be injected parenterally. For parenteral administration they may be used in the form of a sterile solution containing other solutes, for example, enough saline or glucose to make the solution isotonic.

The dosage of the present tetrahydrobenzonaphthyridines and octahydrobenzonaphthyridines compounds when employed as central nervous system depressant agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

Further, it has been surprisingly found that 2-benzyl-7-chloro-1,2,3,4-tetrahydro-5-phenylbenzo[b][1,7]naphthyridine hydrochloride and 9-chloro-2-ethyl-1,2,3,4-tetrahydro-5-phenylbenzo[b][1,7]naphthyridine of the present invention also possess valuable amebicidal activity. In particular, when tested in standard in vitro screening procedures, these two compounds have demonstrated anti-amebic activity, especially against *Endameba histolytica* and are, therefore, useful as anti-amebic agents.

In the amebicidal evaluation of these two compounds of this invention, the test compound is incorporated and diluted in the aqueous phase of Boeck - Drbohlav diphasic medium fortified with rice starch. The medium is inoculated with polybacteria and a known number of trophozoites of *E. histolytica* NIH 200. After 48 hours incubation at 35°C., the trophozoites are counted. The procedure is derived from Thompson, et al., Antibio. and Chemo., 6, 337–50 (1956). The endpoint is expressed as the percent of *E. histolytica* killed at a particular concentrtion ($\mu$g./ml.) of test compound. In this test, 2-benzyl-7-chloro-1,2,3,4-tetrahydro-5-phenylbenzo-[b][1,7]naphthyridine hydrochloride demonstrated a percent kill of *E. histolytica* ranging from 16 percent at 500 $\mu$g./ml. to 22 percent at 1000 $\mu$g./ml. and 9-chloro-2-ethyl-1,2,3,4-tetrahydro-5-phenylbenzo[b][1,7]naphthyridine demonstrated a percent kill of *E. histolytica* ranging from 66 percent at 250 $\mu$ g./ml. to 90 percent at 1000 $\mu$g./ml.

The anti-amebic activity of these two compounds of this invention can be utilized for washing equipment in hospitals and homes, instruments used in medicine and bacteriology, clothing used in bacteriological laboratories, and floors, walls and ceiling in rooms in which a background free of *E. histolytica* is desired.

The reactants employed in the first above-described process are known compounds which are commercially available and/or prepared by well-known procedures. In this regard, the "3-piperidone" reactants may be prepared by the methods described in S. M. McElvain and John F. Vozza, J. Am. Chem. Soc., 71, 896 (1949) and Peter T. Lansbury and Daniel J. Scharf, J. Am. Chem. Soc., 90, 536 (1968).

The "o-aminocarbonyl compound" reactants employed in the first above-described process may be prepared by the procedures described by: G. N. Walker in J. Org. Chem., 27, 1929 (1962); F. Korte and O, Behner in Ann. 621, 51 (1959); S. Bell et al., in U.S. Pat. application Ser. No. 609,999 filed Jan. 18, 1967 entitled "3-(2-Amino-5-Halo, 5-Alkyl-and-5-Alkoxy)Benzene Sulfonamides;" now U.S. Pat. No. 3,516,992 granted June 9, 1970 L. H. Sternbach et al. in J. Org. Chem. 26,448 (1961); and L. H. Sternbach et al. in J. Org. Chem. 27, 3781 (1962).

The following examples are given by way of illustration and are not to be construed as limitations of this invention, many variations of which are possible without departing from the scope and spirit thereof.

EXAMPLE I

A mixture of 2-amino-5-chlorobenzophenone (7.8 g., 0.0335 m), 1-benzyl-3-piperidone (5.0 g., 0.0335 m.) and trifluoroacetic acid (40 ml) is refluxed with stirring for 8 hours. The cooled reaction mixture is poured with stirring into a mixture of ice and water (200 ml). The resulting solution is filtered and basified with 50 percent sodium hydroxide. The product separates as a gum which is extracted with ether, dried an the hydrochloride salt formed by routine procedures. Recrystallization of this solid from ethanol-water gives light yellow crystals of 2-benzyl-7-chloro-1,2,3,4-tetrahydro-5-phenylbenzo[b][1,7]naphthyridine hydrochloride, m.p. 248°–250°C. (uncorrected).

ANALYSIS Calcd for $C_{25}H_{21}ClN_3 \cdot HCl$: C, 71.25; H, 5.27; N, 6.65; Cl, 16.8.

Found: C, 71.17; H, 5.06; N, 6.67; Cl, 16.7.

In a similar manner, using the appropriate starting materials, the following compounds are provided:

7-bromo-5-(p-chlorophenyl)-1,2,3,4-tetrahydro-2-methylbenzo[b][1,7]naphthyridine hydrochloride;

2-(o-bromophenyl)-1,2,3,4-tetrahydro-8-methyl-5-(p-tolyl)benzo[b][1,7]naphthyridine hydrobromide;

8-ethoxy-2-(p-ethylphenyl)-1,2,3,4-tetrahydro-5-[p-(trifluoromethyl)phenyl]benzo[b][1,7]naphthyridine hydrochloride;

2-acetyl-1,2,3,4-tetrahydro-8,9-dimethoxy-5-(2-thienyl)-benzo[b][1,7]naphthyridine hydrochloride;

2-fluoroacetyl-1,2,3,4-tetrahydro-8-iodo-5-phenyl-benzo-[b][1,7]naphthyridine hydrobromide;

2-(3,3dibromopropionyl)-8-ethoxy-5-(p-fluorophenyl)-1,2,3,4-tetrahydrobenzo[b][1,7]naphthyridine sulfate;

5-(p-ethoxyphenyl)-2-ethylsulfonyl-1,2,3,4-tetrahydro-7,8-dipropoxybenzo[b][1,7]naphthyridine hydrochloride;

5-(m-bromophenyl)-1,2,3,4-tetrahydro-8-iodo-2-(methoxymethyl)benzo[bgt][1,7]naphthyridine phosphate;

5-(p-ethylphenyl)-7-trifluoromethyl-1,2,3,4-tetrahydro-2-(3,4-dihydroxybutyl)benzo[b][1,7]naphthyridine hydrochloride.

EXAMPLE II

A mixture of 2-amino-3-chlorobenzophenone (5.0 g., 0.0216 m), 1-ethyl-3-piperidone hydrochloride (3.65 g, 0.0216 m) and trifluoroacetic acid (40 ml) is refluxed with stirring for 8 hours. The cooled reaction mixture is poured with stirring into a mixture of ice and water (200 ml). The resulting solution is filtered and basified with 50 percent sodium hydroxide. The product separates as an oil which upon trituration with hexane gives a solid (6.1 g). Recrystallization of the product from hexane affords a crystalline solid, 9-chloro-2-ethyl-1,2,3,4-tetrahydro-5-phenylbenzo[b][1,7]naphthyridine, m.p. 110°–111°C. (uncorrected).

Analysis Calcd. for $C_{20}H_{19}ClN_2$: C, 74.42; H, 5.93; N, 8.67.

Found: C, 74.34; H, 5.69; N, 8.94.

In a similar manner, using the appropriate starting materials, the following compounds are provided:

5-(p-bromophenyl)-2-ethyl-7-fluoro-1,2,3,4-tetrahydrobenzo[b][1,7]naphthyridine;

8-ethyl-5-(m-ethylphenyl)-1,2,3,4-tetrahydro-2-(p-iodophenyl)benzo[b][1,7]naphthyridine;

2-benzyl-7-(trifluoromethyl)-1,2,3,4-tetrahydro-5-(2-pyridyl)benzo[b][1,7]naphthyridine;

6-chloro-1,2,3,4-tetrahydro-2-propionyl-5-(3-thienyl)benzo[b][1,7]naphthyridine;

5-(p-chlorophenyl)-1,2,3,4-tetrahydro-5-iodoacetyl-7-nitrobenzo[b][1,7]naphthyridine; 8-trifluoromethyl-1,2,3,4-tetrahydro-2dimethylaminoacetyl-5-(p-tolyl)benzo[b][1,7]naphthyridine;

9-chloro-5-[p-(trifluoromethyl)penyl]-1,2,3,4-tetrahydro-2-(phenylsulfonyl)benzo[b][1,7]naphthyridine;

2-ethoxymethyl-5-(p-fluorophenyl)-1,2,3,4-tetrahydro-8-nitrobenzo[b][1,7]naphthyridine;

1,2,3,4-tetrahydro-2-(1,3-dihydroxyprop-2-yl)-7-isopropyl-5-(p-propylphenyl)benzo[b][1,7]naphthyridine.

EXAMPLE III

A mixture of 2-amino-5-chlorophenyl-2-thienyl ketone (5.0 g, 0.021 m), 1-ethyl-3-piperidone hydrochloride (3.44 g, 0.021 m) and trifluoroacetic acid (40 ml) is refluxed with stirring for 8 hours. The cooled reaction mixture is poured with stirring into a mixture of ice and water (200 ml). The resulting solution is filtered and basified with 50 percent sodium hydroxide. The free base separates as a gum which is extracted with hot hexane. On cooling the product separates from the hot hexane as a crystalline solid. Recrystallization of the product from pentane affords a crystalline solid, 8-chloro-2-ethyl-1,2,3,4-tetrahydro-5-(2-thienyl)benzo[b][1,7]naphthyridine, m.p. 75°–77°C. (uncorrected).

Analysis Calcd. for $C_{18}H_{17}ClN_2S$: C, 65.75; H, 5,21; N, 8.52.

Found: C, 65.56; H, 5.18; N, 8.55.

In a similar manner, using the appropriate starting materials, the following compounds are provided:

5-(m-fluorophenyl)-1,2,3,4-tetrahydro-7-iodo-2-phenylbenzo[b][1,7]naphthyridine;

5-(p-anisyl)-8-butyl-2-(o-fluorophenyl)-1,2,3,4-tetrahydrobenzo[b][1,7]naphthyridine;

7,8-dichloro-1,2,3,4-tetrahydro-2-(2-phenethyl)-5-(3-pyridyl)benzo[b][1,7]naphthyridine;

7-bromo-2-chloroacetyl-5-(2-furyl)-1,2,3,4-tetrahydrobenzo[b][1,7]naphthyridine;

5-(m-bromophenyl)-2-(3-chloropropionyl)-1,2,3,4-tetrahydro-8-methylbenzo[b][1,7]naphthyridine;

6,8-dibromo-2-diethylaminoacetyl-5-(p-ethylphenyl)-1,2,3,4-tetrahydrobenzo[b][1,7]naphthyridine;

7-bromo-2-ethylcarbamoyl-1,2,3,4-tetrahydro-5-phenylbenzo[b][1,7]naphthyridine;

7-ethyl-1,2,3,4-tetrahydro-5-(p-iodophenyl)-2-(dimethylaminomethyl)benzo[hb][1,7]naphthyridine.

EXAMPLE IV

2-Amino-4,4′,5-trimethoxybenzophenone (6.0 g, 0.021 m), 1-ethyl-3-piperidone hydrochloride (3.44 g, 0.021 m), a trace of p-toluene sulfonic acid and toluene (150 ml) are allowed to reflux for 8 hours over a Dean-Stark trap. The solution is evaporated and the residue triturated with hexane, giving a solid. This is triturated again with benzene and this solid converted to the free base. Recrystallization of the product from methylcyclohexane affords a crystalline solid, 2-ethyl-1,2,3,4-tetrahydro-7,8-dimethoxy-5-(p-methoxyphenyl)benzo[b][1,7]naphthyridine, m.p. 153°–154° C (uncorrected).

Analysis Calcd. for $C_{23}H_{26}N_2O_3$: C, 72.98; H, 6,92; N, 7.39.

Found: C, 72,57; H, 7.00; N, 7.36.

In a similar manner, using the appropriate starting materials, the following compounds are provided:

5-(m-ethoxyphenyl)-1,2,3,4-tetrahydro-7-methoxy-2-(p-tolyl)benzo[b][1,7]naphthyridine;

2-amidino-7-chloro-1,2,3,4-tetrahydro-5-phenyl-benzo[b][1,7]naphthyridine;

2-(p-chlorophenyl)-1,2,3,4-tetrahydro-5-(p-iodophenyl)-7-nitrobenzo[b][1,7]naphthyridine;

2-benzoyl-1,2,3,4-tetrahydro-7,8-dimethyl-5-(4-pyridyl)benzo[b][1,7]naphthyridine;

2-bromoacetyl-7-fluoro-5-(3-furyl)-1,2,3,4-tetrahydrobenzo[b][1,7]naphthyridine;

2-dichloroacetyl-1,2,3,4-tetrahydro-5-(p-iodophenyl)-7-pentylbenzo[b][1,7]naphthyridine;

5-(m-anisyl)-7,8-diethyl-1,2,3,4-tetrahydro-2-mesyl-benzo[b][1,7]naphthyridine;

5-(p-chlorophenyl)-7-fluoro-1,2,3,4-tetrahydro-2-(propylcarbomoyl)benzo[b][1,7]naphthyridine;

2-[3-(diethylamino)propyl]-5-(p-ethylphenyl)-1,2,3,4-tetrahydro-8-propylbenzo[b][1,7]naphthyridine;

EXAMPLE V

A solution of 2-benzyl-7-chloro-1,2,3,4-tetrahydro-5-phenylbenzo[b][1,7]naphthyridine in glacial acetic acid (100 ml.) containing platinum oxide (0.3 g.) is hydrogenated at room temperature and an additional hydrogen pressure of 46.5 psi for a period of 24 hours. The excess acetic acid is distilled, in vacuo, the residue dissolved in water, and then basified, whereupon the crude product separates. Recrystallization from cyclohexane-hexane affords 2-benzyl-7-chloro-1,2,3,4a,5,10,10a-octahydro-5-phenylbenzo[b][1,7]-naphthyridine.

In a similar manner, using the appropriate starting materials, the following compounds are provided:

9-chloro-2-ethyl-1,2,3,4,4a,5,10,10a-octahydro-5-phenylbenzo[b][1,7]naphthyridine;

8-chloro-2-ethyl-1,2,3,4,4a,5,10,10a-octahydro-5-(2-thienyl)benzo[b][1,7]naphthyridine;

2-ethyl-1,2,3,4,4a,5,10,10a-octahydro-7,8-dimethoxy-5-(p-methoxyphenyl)benzo[b][1,7]naphthyridine.

What is claimed is:

1. A compound selected from the group consisting of those having the formulas:

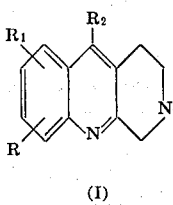   and   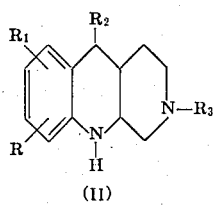

(I)                    (II)

wherein R is hydrogen and R₁ is selected from the group consisting of hydrogen, halogen, lower alkyl, lower alkoxy and trifluoromethyl; ₂ is selected from the group consisting of phenyl, halophenyl, lower alkylphenyl, lower alkoxyphenyl, trifluoromethylphenyl, 2-pyridyl, 3-pyridyl 4-pyridyl, 2-thienyl, 3-thienyl, 2-furyl, and 3-furyl, and R₃ is selected from the group consisting of hydrogen, amidino, lower alkyl, phenyl, halophenyl, lower alkylphenyl, phenyl(lower)alkyl, benzoyl, lower alkanoyl, halo(lower) alkanoyl, dihalo(lower)alkanoyl, lower alkanoyloxy, di(lower)alkylamino(lower)alkanoyl, lower alkylsulfonyl, phenylsulfonyl, lower alkylcarbamoyl, lower alkoxy(lower)alkyl, di(lower)alkylamino(lower)alkyl and dihydroxy(lower)alkyl; and the pharmaceutically acceptable acid addition salts thereof; wherein said lower alkyl or lower alkyl portion of lower alkoxy or lower alkanoyl is from one to six carbon atoms.

2. A compound set forth in claim 1, formula (I), which is: which is: 2-benzyl-7-chloro-1,2,3,4b][1,7]naphthyridine hydrochloride.

3. A compound as set forth in claim 1, formula (I), which is: 9-chloro-2-ethyl-1,2,3,4-tetrahydro-5-phenyl-benzo-[b][1,7]naphthyridine.

4. A compound as set forth in claim 1, formula (I), which is: 8-chloro-2-ethyl-1,2,3,4-tetrahydro-5-(2-thienyl)benzo[b][1,7]naphthyridine.

5. A compound as set forth in claim 1, formula (I), which is: 2-ethyl-1,2,3,4-tetrahydro-7,8-dimethoxy-5-(p-methoxyphenyl)benzo[b][1,7]naphthyridine.

* * * * *